(12) United States Patent
Brickell

(10) Patent No.: US 10,826,904 B2
(45) Date of Patent: *Nov. 3, 2020

(54) LOCAL VERIFICATION OF CODE AUTHENTICATION

(71) Applicant: Intel Corporation, Santa Clara, CA (US)

(72) Inventor: Ernie F. Brickell, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 16/294,538

(22) Filed: Mar. 6, 2019

(65) Prior Publication Data

US 2019/0273738 A1 Sep. 5, 2019

Related U.S. Application Data

(63) Continuation of application No. 15/872,426, filed on Jan. 16, 2018, now Pat. No. 10,257,193, which is a (Continued)

(51) Int. Cl.
*H04L 9/00* (2006.01)
*H04L 29/06* (2006.01)
*H04L 9/32* (2006.01)

(52) U.S. Cl.
CPC ........ *H04L 63/0876* (2013.01); *H04L 9/3242* (2013.01); *H04L 9/3247* (2013.01); (Continued)

(58) Field of Classification Search
CPC ............................ H04L 9/3247; H04L 9/3242
(Continued)

(56) References Cited

U.S. PATENT DOCUMENTS 6,654,889 B1 * 11/2003 Trimberger ............. G06F 21/76
713/188
8,938,792 B2 * 1/2015 Koeberl .................. G06F 21/70
726/10
(Continued)

OTHER PUBLICATIONS

"U.S. Appl. No. 15/052,672, Notice of Allowability dated Oct. 25, 2017", 3 pgs.
(Continued)

*Primary Examiner* — Longbit Chai
(74) *Attorney, Agent, or Firm* — Schwegman Lundberg & Woessner, P.A.

(57) ABSTRACT

Embodiments are directed to a computing device having execution hardware including at least one processor core, and non-volatile memory that stores verification module and a private symmetric key unique to the computing device. The verification module, when executed on the execution hardware, causes the execution hardware to perform pre-execution local authenticity verification of externally-supplied code in response to a command to launch that code. The local authenticity verification includes computation of a cryptographic message authentication code (MAC) of the externally-supplied code based on the private symmetric key, and verification of the MAC against a stored local authenticity verification value previously written to the non-volatile memory. In response to a positive verification of the of the MAC, execution of the externally-supplied code is permitted.

5 Claims, 8 Drawing Sheets

Related U.S. Application Data continuation of application No. 15/052,672, filed on Feb. 24, 2016, now Pat. No. 9,900,310.

(52) U.S. Cl.
CPC ........ H04L 9/3278 (2013.01); H04L 63/0435 (2013.01); H04L 63/123 (2013.01)

(58) Field of Classification Search
USPC .......................................................... 726/26
See application file for complete search history.

(56) References Cited

U.S. PATENT DOCUMENTS

| | | |
|---|---|---|
| 9,432,362 B2 * | 8/2016 | Shah ..................... G06F 21/725 |
| 9,900,310 B2 | 2/2018 | Brickell |
| 10,257,193 B2 | 4/2019 | Brickell |
| 2017/0244704 A1 | 8/2017 | Brickell |
| 2018/0234417 A1 | 8/2018 | Brickell |

OTHER PUBLICATIONS

"U.S. Appl. No. 15/052,672, Notice of Allowance dated Oct. 11, 2017", 11 pgs.
"U.S. Appl. No. 15/872,426, Notice of Allowance dated Nov. 30, 2018", 12 pgs.
U.S. Appl. No. 15/052,672, U.S. Pat. No. 9,900,310, filed Feb. 24, 2016, Local Verification of Code Authentication.
U.S. Appl. No. 15/872,426, U.S. Pat. No. 10,257,193, filed Jan. 16, 2018, Local Verification of Code Authentication.

* cited by examiner

LOCAL VERIFICATION OF CODE AUTHENTICATION

PRIORITY

This application is a continuation of U.S. application Ser. No. 15/872,426, filed Jan. 16, 2018, now issued as U.S. Pat. No. 10,257,193, which is a continuation of U.S. patent application Ser. No. 15/052,672 filed Feb. 24, 2016, now issued as U.S. Pat. No. 9,900,310, all of which are incorporated by reference herein in their entireties.

TECHNICAL FIELD

Embodiments described herein generally relate to information processing and security, more particularly, to assuring the authenticity of firmware or software code to be executed by a processor of a computer system.

BACKGROUND

Processor-based computing platforms are employed in a wide variety of applications, from personal computers (PCs), smartphones, and other information-oriented devices, to industrial controls, vehicles, appliances, consumer electronic articles, and wearable devices, just to name a few. In virtually every application, reliable operation and information security are paramount.

Processors generally execute foundational code, such as firmware that coordinates basic operations of the processor, launches programs, and the like. Examples of foundational code include microcode, basic input/output system (BIOS) code, Unified Extensible Firmware Interface (UEFI) code, and the like. In systems where the foundational code may be replaced or updated, changes to the foundational code have been recognized as presenting a potential attack vector for compromising the computer system.

To provide assurance of the authenticity of foundational code, as well as other system or application programs, a system for code authentication is used. Typically, a piece of code (e.g., microcode update, new BIOS version, etc.) is digitally signed using an private key belonging to the trusted creator or distributor of the code. A public-key-based verification algorithm is executed by the processor on system startup, or whenever each applicable piece of code is called to be executed. One drawback of this approach is that the use of asymmetric keys for code authentication is a computationally intensive operation, which tends to introduce some nontrivial delay during startup or execution of code to be authenticated. Another drawback is the risk that asymmetric key-based cryptographic techniques may someday be defeated using emerging technology such as quantum computing. Accordingly, there is a need for a practical solution that addresses one or more of these challenges.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Aspects of the embodiments are directed to authentication of executable code in a processor-based computing platform. Some embodiments feature an isolated execution environment (IEE) that provides secure, isolated, storage of sensitive data values and secure, isolated authentication and execution of any code that can access these data values, in isolation from any code external to the IEE, such as operating system kernel code. In some of the embodiments described below, a processor circuit includes hardware features to assure integrity of the IEE. It will be understood that suitable alternative implementations may be realized in which an IEE is provided on a computing platform through the execution of program instructions. The computing platform may be one physical machine, or may be distributed among multiple physical machines, such as by role or function, or by process thread in the case of a cloud computing distributed model. In various embodiments certain operations may run in virtual machines that in turn are executed on one or more physical machines. It will be understood by persons of skill in the art that features of the invention may be realized by a variety of different suitable machine implementations.

Figure 1:
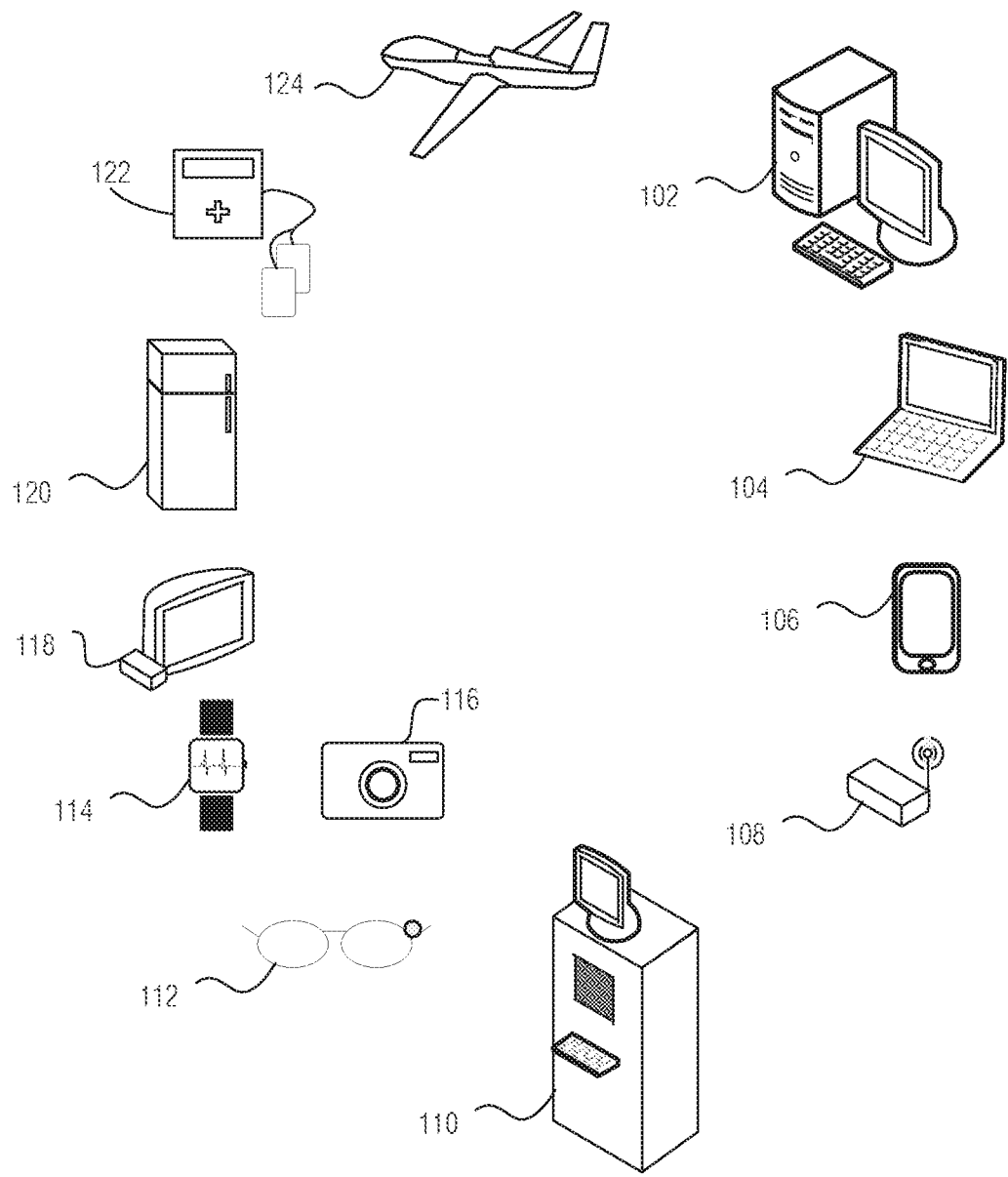
FIG. 1 is a high-level diagram illustrating examples of various types of computing platforms on which aspects of the invention may be implemented according to some embodiments.

FIG. 1 is a high-level diagram illustrating examples of various types of computing platforms on which aspects of the embodiments may be implemented according to some embodiments. The computing platforms include personal computers, such as desktop PC 102, laptop 104, smartphone/tablet 106, and the like. Other types of information devices, such as networking appliance 108, which represents a switch, router, access point, etc., are computing platforms that are also contemplated. Industrial equipment 110, such as control systems, automated tooling, motor/robotics controls, programmable logic controllers, are also types of computing platforms on which aspects of the embodiments may be implemented. Computing platforms may also be implemented as consumer-electronic devices, such as smart glasses 112, smartwatch 114, digital camera 116, and media device 118, such as a set-top box as depicted, audio playback system, etc. Appliance 120 may also contain a computing system such as, for instance, an internet of things (IOT)

node. Medical device 122 may contain an embedded computing platform. Likewise vehicle 124 may also contain one or more computing platforms. Each computing platform may include a processor-based system. e.g., a machine capable of executing instructions (sequential or otherwise) that specify actions to be taken by that machine, on which an isolated execution environment (IEE) may be established.

Figure 2:
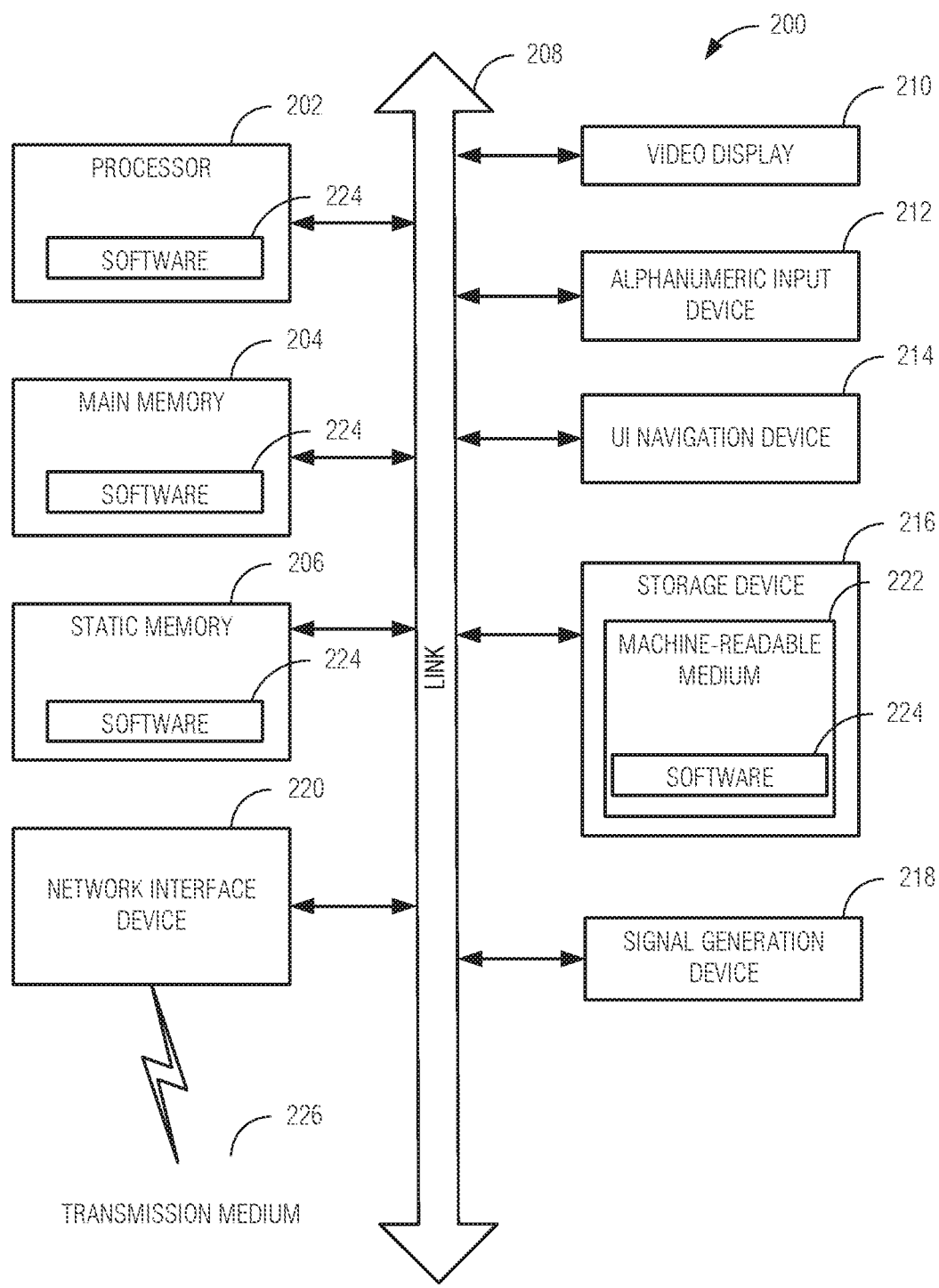
FIG. 2 is a block diagram illustrating an exemplary system architecture of a processor-based computing device according to an embodiment.

FIG. 2 is a block diagram illustrating a computer system in the example form of a general-purpose machine. In certain embodiments, programming of the computer system 200 according to one or more particular algorithms produces a special-purpose machine upon execution of that programming. In a networked deployment, the computer system may operate in the capacity of either a server or a client machine in server-client network environments, or it may act as a peer machine in peer-to-peer (or distributed) network environments.

Example computer system 200 includes at least one processor 202 (e.g., a central processing unit (CPU), a graphics processing unit (GPU) or both, processor cores, compute nodes, etc.), a main memory 204 and a static memory 206, which communicate with each other via a link 208 (e.g., bus). The computer system 200 may further include a video display unit 210, an alphanumeric input device 212 (e.g., a keyboard), and a user interface (UI) navigation device 214 (e.g., a mouse). In one embodiment, the video display unit 210, input device 212 and UI navigation device 214 are incorporated into a touch screen display. The computer system 200 may additionally include a storage device 216 (e.g., a drive unit), a signal generation device 218 (e.g., a speaker), a network interface device (NID) 220, and one or more sensors (not shown), such as a global positioning system (GPS) sensor, compass, accelerometer, or other sensor.

The storage device 216 includes a machine-readable medium 222 on which is stored one or more sets of data structures and instructions 224 (e.g., software) embodying or utilized by any one or more of the methodologies or functions described herein. The instructions 224 may also reside, completely or at least partially, within the main memory 204, static memory 206, and/or within the processor 202 during execution thereof by the computer system 200, with the main memory 204, static memory 206, and the processor 202 also constituting machine-readable media.

While the machine-readable medium 222 is illustrated in an example embodiment to be a single medium, the term "machine-readable medium" may include a single medium or multiple media (e.g., a centralized or distributed database, and/or associated caches and servers) that store the one or more instructions 224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

NID 220 according to various embodiments may take any suitable form factor. In one such embodiment, NID 220 is in the form of a network interface card (NIC) that interfaces with processor 202 via link 208. In one example, link 208 includes a PCI Express (PCIe) bus, including a slot into which the NIC form-factor may removably engage. In another embodiment, NID 220 is a network interface circuit laid out on a motherboard together with local link circuitry, processor interface circuitry, other input/output circuitry, memory circuitry, storage device and peripheral controller circuitry, and the like. In another embodiment. NID 220 is a peripheral that interfaces with link 208 via a peripheral input/output port such as a universal serial bus (USB) port. NID 220 transmits and receives data over transmission medium 226, which may be wired or wireless (e.g., radio frequency, infra-red or visible light spectra, etc.), fiber optics, or the like.

Figure 3:
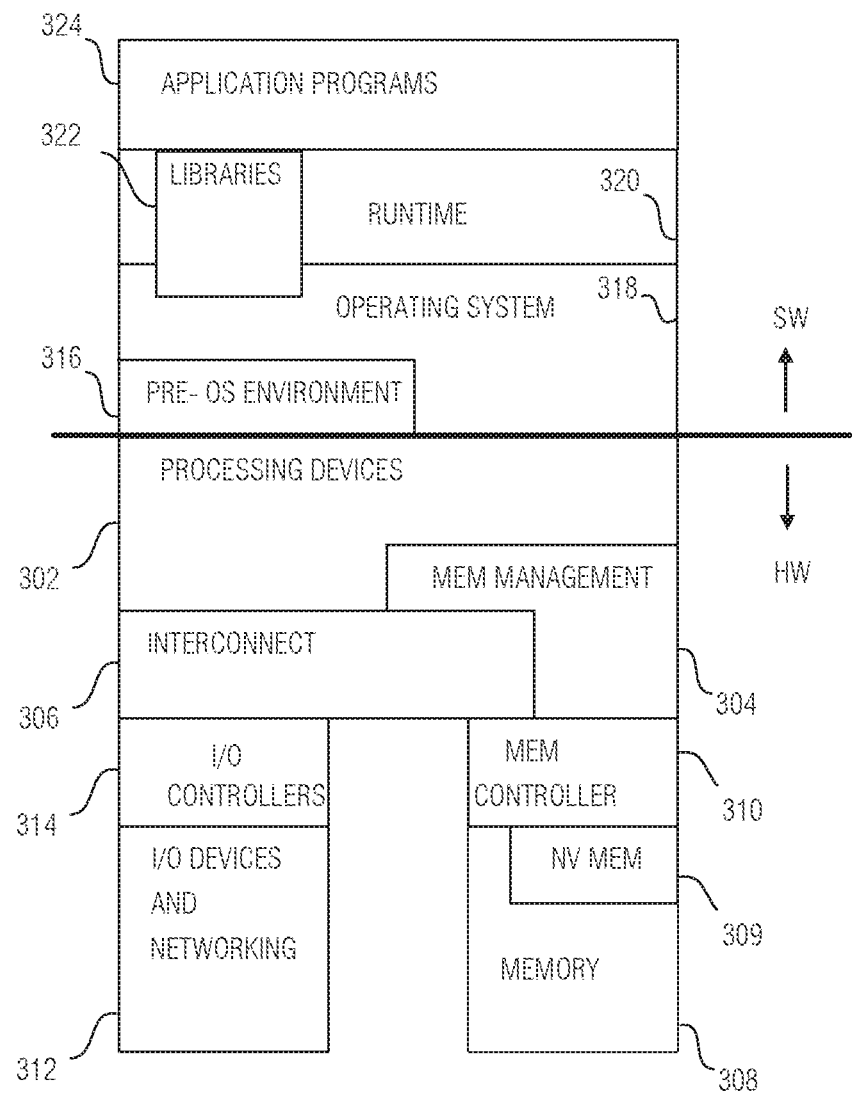
FIG. 3 is a diagram illustrating an exemplary hardware and software architecture of a computing device such as the one depicted in FIG. 2, in which various interfaces between hardware components and software components are shown.

FIG. 3 is a diagram illustrating an exemplary hardware and software architecture of a computing device such as the one depicted in FIG. 2, in which various interfaces between hardware components and software components are shown. As indicated by HW, hardware components are represented below the divider line, whereas software components denoted by SW reside above the divider line. On the hardware side, processing devices 302 (which may include one or more microprocessors, digital signal processors, etc., each having one or more processor cores, are interfaced with memory management device 304 and system interconnect 306. Memory management device 304 provides mappings between virtual memory used by processes being executed, and the physical memory. Memory management device 304 may be an integral part of a central processing unit which also includes the processing devices 302.

Interconnect 306 includes a backplane such as memory, data, and control lines, as well as the interface with input/output devices. e.g., PCI, USB, etc. Memory 308 (e.g., dynamic random access memory—DRAM) and non-volatile memory 309 such as flash memory (e.g., electrically-erasable read-only memory—EEPROM, NAND Flash, NOR Flash, etc.) are interfaced with memory management device 304 and interconnect 306 via memory controller 310. This architecture may support direct memory access (DMA) by peripherals in some embodiments. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 312, which interface with interconnect 306 via corresponding I/O controllers 314.

On the software side, a pre-operating system (pre-OS) environment 316, which is executed at initial system start-up and is responsible for initiating the boot-up of the operating system. One traditional example of pre-OS environment 316 is a system basic input/output system (BIOS). In present-day systems, a unified extensible firmware interface (UEFI) is implemented. Pre-OS environment 316, is responsible for initiating the launching of the operating system, but also provides an execution environment for embedded applications according to certain aspects of the invention.

Operating system (OS) 318 provides a kernel that controls the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 318 provides device drivers, and a variety of common services such as those that facilitate interfacing with peripherals and networking, that provide abstraction for application programs so that the applications do not need to be responsible for handling the details of such common operations. Operating system 318 additionally provides a graphical user interface (GUI) that facilitates interaction with the user via peripheral devices such as a monitor, keyboard, mouse, microphone, video camera, touchscreen, and the like.

Runtime system 320 implements portions of an execution model including such operations as putting parameters onto the stack before a function call, the behavior of disk input/output (I/O), and parallel execution-related behaviors. Runtime system 320 may also perform support services such as type checking, debugging, or code generation and optimization.

Libraries 322 include collections of program functions that provide further abstraction for application programs. These include shared libraries, dynamic linked libraries (DLLs), for example. Libraries 322 may be integral to the operating system 318, runtime system 320, or may be added-on features, or even remotely-hosted. Libraries 322 define an application program interface (API) through which a variety of function calls may be made by application programs 324 to invoke the services provided by the operating system 318. Application programs 324 are those programs that perform useful tasks for users, beyond the tasks performed by lower-level system programs that coordinate the basis operability of the computing device itself.

Figure 4:
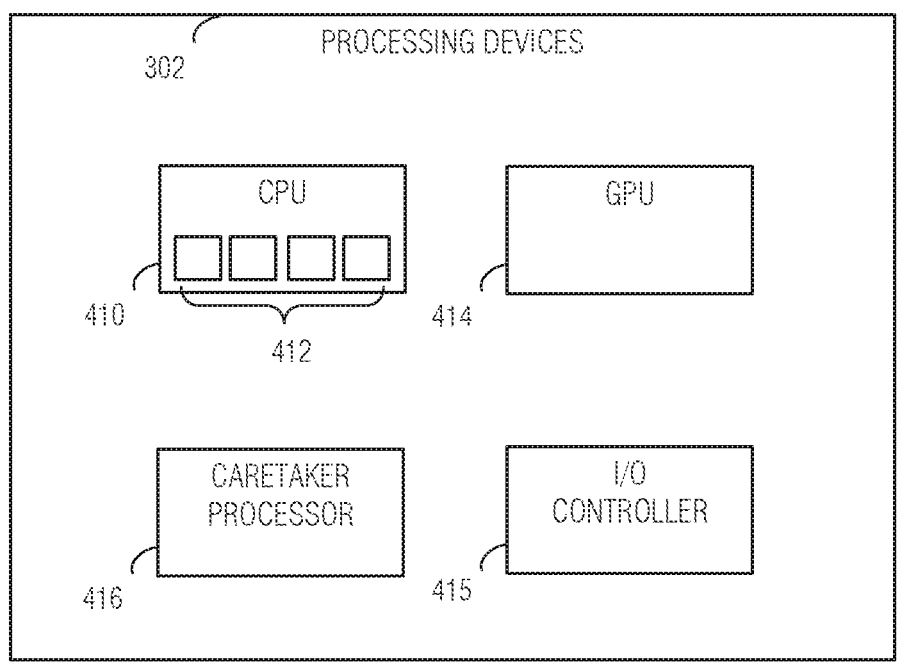
FIG. 4 is a block diagram illustrating examples of processing devices that may be implemented on a computer system, such as the computer system described with reference to FIGS. 2-3, according to some embodiments.

FIG. 4 is a block diagram illustrating processing devices 302 according to some embodiments. CPU 410 may contain one or more processing cores 412, each of which has one or more arithmetic logic units (ALU), instruction fetch unit, instruction decode unit, control unit, registers, data stack pointer, program counter, and other essential components according to the particular architecture of the processor. As an illustrative example, CPU 410 may be a x86-type of processor. Processing devices 302 may also include a graphics processing unit (GPU) 414. In these embodiments, GPU 414 may be a specialized co-processor that offloads certain computationally-intensive operations, particularly those associated with graphics rendering, from CPU 410. Notably. CPU 410 and GPU 414 generally work collaboratively, sharing access to memory resources, I/O channels, etc.

Processing devices 302 may also include caretaker processor 416 in some embodiments. Caretaker processor 416 generally does not participate in the processing work to carry out software code as CPU 410 and GPU 414 do. In some embodiments, caretaker processor 416 does not share memory space with CPU 410 and GPU 414, and is therefore not arranged to execute operating system or application programs. Instead, caretaker processor 416 may execute dedicated firmware that supports the technical workings of CPU 410, GPU 414, and other components of the computer system. In some embodiments, caretaker processor is implemented as a microcontroller device, which may be physically present on the same integrated circuit die as CPU 410, or may be present on a distinct integrated circuit die. Caretaker processor 416 may also include a dedicated set of I/O facilities to enable it to communicate with external entities. In one type of embodiment, caretaker processor 416 is implemented using a manageability engine (ME) or platform security processor (PSP). Input/output (I/O) controller 415 coordinates information flow between the various processing devices 410, 414, 416, as well as with external circuitry, such as a system interconnect.

In one embodiment, two or more of processing devices 302 depicted are formed on a common semiconductor substrate.

Figure 5:
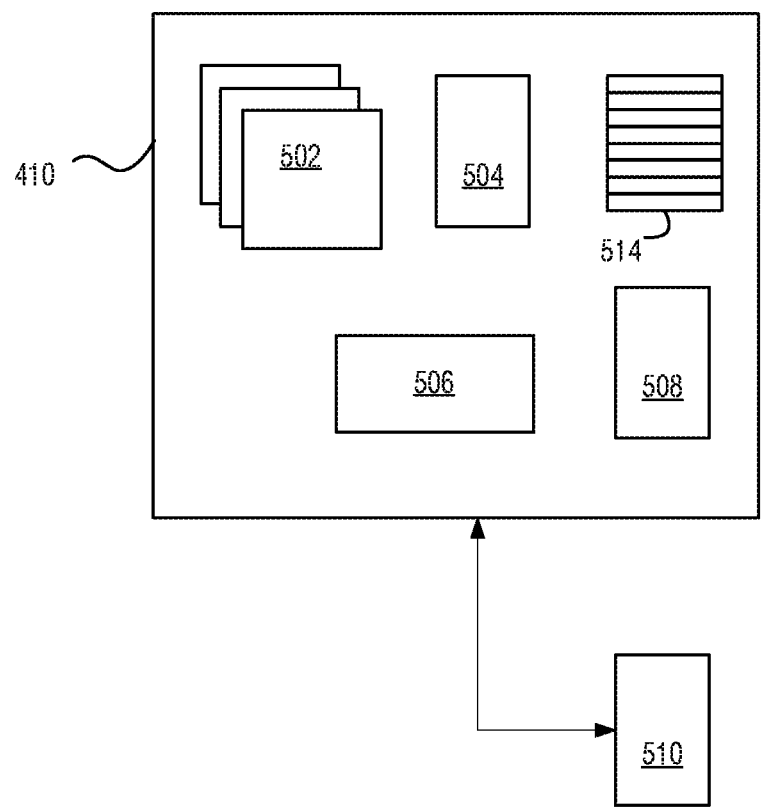
FIG. 5 is a block diagram illustrating example components of a CPU as one of the processing devices depicted in FIG. 4, according to various embodiments.

FIG. 5 is a block diagram illustrating example components of CPU 410 according to various embodiments. As depicted, CPU 410 includes one or more cores 502, cache 504, and CPU controller 506, which coordinates interoperation and tasking of the core(s) 502, as well as providing an interface to facilitate data flow between the various internal components of CPU 410, and with external components such as a memory bus or system interconnect. In one embodiment, all of the example components of CPU 410 are formed on a common semiconductor substrate.

CPU 410 includes non-volatile memory 508 (e.g., flash. EEPROM, etc.) for storing certain portions of foundational code, such as an initialization module, an authentication conversion (AC) module, and microcode. Also, CPU 410 may be interfaced with an external (e.g., formed on a separate IC) non-volatile memory device 510 that stores foundational code that is launched by the initialization module, such as system BIOS or UEFI code.

In a related embodiment, the initialization module, the authentication conversion (AC) module, or the microcode may be implemented in hardware logic, such as using logic gates, or a programmable logic device (PLD), field-programmable gate array device, or the like, integrated with CPU 410.

In the embodiment depicted. CPU 410 is configured to provide an Isolated Execution Environment (IEE). In one example IEE, the CPU, at boot time, loads a particular piece of code into its internal memory. Before that code may be executed, the CPU computes a hash of the code, and either compares that hash to a value stored in hardware, or performs a digital signature validation on the hash using a public key in which either the public key or a hash of the public key is stored in the CPU. If the check passes, then the CPU proceeds with execution according to the privileges of the code. The privileges could be stored in the CPU along with the hash of the code, or they could be included in the code itself.

The privileges may include access to restricted resources such as secret keys in the CPU. The CPU then allows this code to execute with the allowed privileges. It does not allow any other code to execute until the particular code has finished, and access to the restricted resources have been restricted. The CPU may force a reboot instead of allowing any execution after the code execution has finished.

In a related embodiment, an IEE can be instantiated at a time other than at boot time. One such embodiment is the technology of Authenticated Code Modules, for example.

According to one aspect of the embodiments, the processor 410 is configured with verification module for verifying the authentication of an updated or entirely newly-introduced piece of code supplied to the processor from a source external to the processor. Hereinafter, any newly received code or update is simply referred to as externally-supplied code (ESC). The ESC may be foundational code, such as a microcode patch, UEFI, or the like, or it may be software such as an operating system component, a runtime component, or an application program. ESC is generally accompanied by a digital signature, which may be based on a private key, for example, belonging to the source of the ESC. The source of the ESC may be the producer, or distributor, of the ESC, for example. Prior to execution of the ESC, the ESC may be authenticated by verifying the digital signature using a public key of the source of the ESC, for example.

According to some embodiments, a computationally-efficient and secure process for authentication of the ESC is provided. In some embodiments, the authenticity of the ESC is verified using the digital signature verification procedure, or some other suitable cryptographic technique. This process can be performed in response to a call to execute the ESC, or at some other time in response to receipt of the ESC. Authentication that verifies traceability of the ESC to its source is hereinafter referred to as a first type of authentication, or source-authentication. Upon successful source-authentication, a second type of authentication mechanism, described below as a local authentication, is established that enables the processor to more efficiently verify the validity of the source-authentication of the ESC.

In some embodiments, the local authentication is based on a private symmetric key (PSK) that is uniquely associated with the processor. Using the PSK, the processor generates a local authenticity verification value (LAV), which is stored in non-volatile storage in the IEE implemented in the processor. Thereafter, in response to a call to execute the ESC, the LAV of the received ESC is computed and checked against the stored LAV. Once the LAV is verified, the ESC is deemed authentic, and therefore the processor is permitted to execute the ESC. The processor verification may also be referred to herein as a second type of authentication.

Notably, the processor verification is based on a trusted computing base (TCB) that is made possible by judicious access control enforcement to the PSK. In one such embodiment, the PSK of the processor is created at the time of manufacture of the processor. The PSK may be generated according to a random function utilizing a physical unclonable function (PUF) or other suitable technique, and written to secure register 514. In other embodiments, the PSK may be derived from a PUF or other key in the HW using a cryptographic function such as a pseudo random function.

In one type of embodiment, the PSK itself is not stored in secure register 514; rather, a unique secret value. e.g., Root_NV_Secret, is stored in secure register 514 of CPU 410. This unique secret value could be used to generate a plurality of different secrets for different usages within the CPU, by for instance, using a PRF with input the Root_NV_Secret, combined with a different SALT value for each of the different usages. The PSK may be one such secret.

In some embodiments, the LAV is a message authentication code (MAC). In one type of embodiment, the MAC may be produced by computation of an HMAC (Hash-based message authentication code) or other suitable cryptographic computation of the ESC and using the PSK. In another embodiment, the ESC is first hashed, and then an HMAC computed on the hash using the PSK. Advantageously, the computation of a MAC is much less computationally intensive than verification of a digital signature using an asymmetric key.

In a related embodiment, the processor verification is established by an authentication converter that is implemented by authentication converter (AC) module executed by the processor. The authentication converter module takes as its input the ESC, the digital signature of the ESC, the private symmetric key, the authentication algorithm for verifying the digital signature, and produces the LAV using the MAC algorithm. The LAV may be stored in a non-volatile memory in the processor, or external to the processor, and may be used by a calling program that calls the ESC for execution to authenticate the ESC prior to each time the ESC is to be executed.

Notably, the LAV may be preferentially used to authenticate the ESC, such that the source-authentication is performed only when the processor-attested authentication is not available. In a related embodiment, a flag stored in non-volatile memory is used to indicate the source-authentication state of the ESC. In one such approach, in response to receiving ESC, and prior to the source-authentication of the ESC, the flag is reset to indicate a not-yet-authenticated status of the ESC. In one embodiment, the next time the processor is booted, the processor launches the IEE and executes the authentication converter module in it. Upon successful source-authentication of the ESC and generation of the LAV for the ESC, the flag is set to indicate that the ESC has been source-authenticated, and that the processor verification is available for verification.

In a related embodiment, a version counter is implemented in non-volatile memory to indicate a sequential value of an update of the ESC. When the ESC is to be authenticated prior to execution, its version may be compared against the version counter value to ensure that the latest version is being called.

Figure 6:
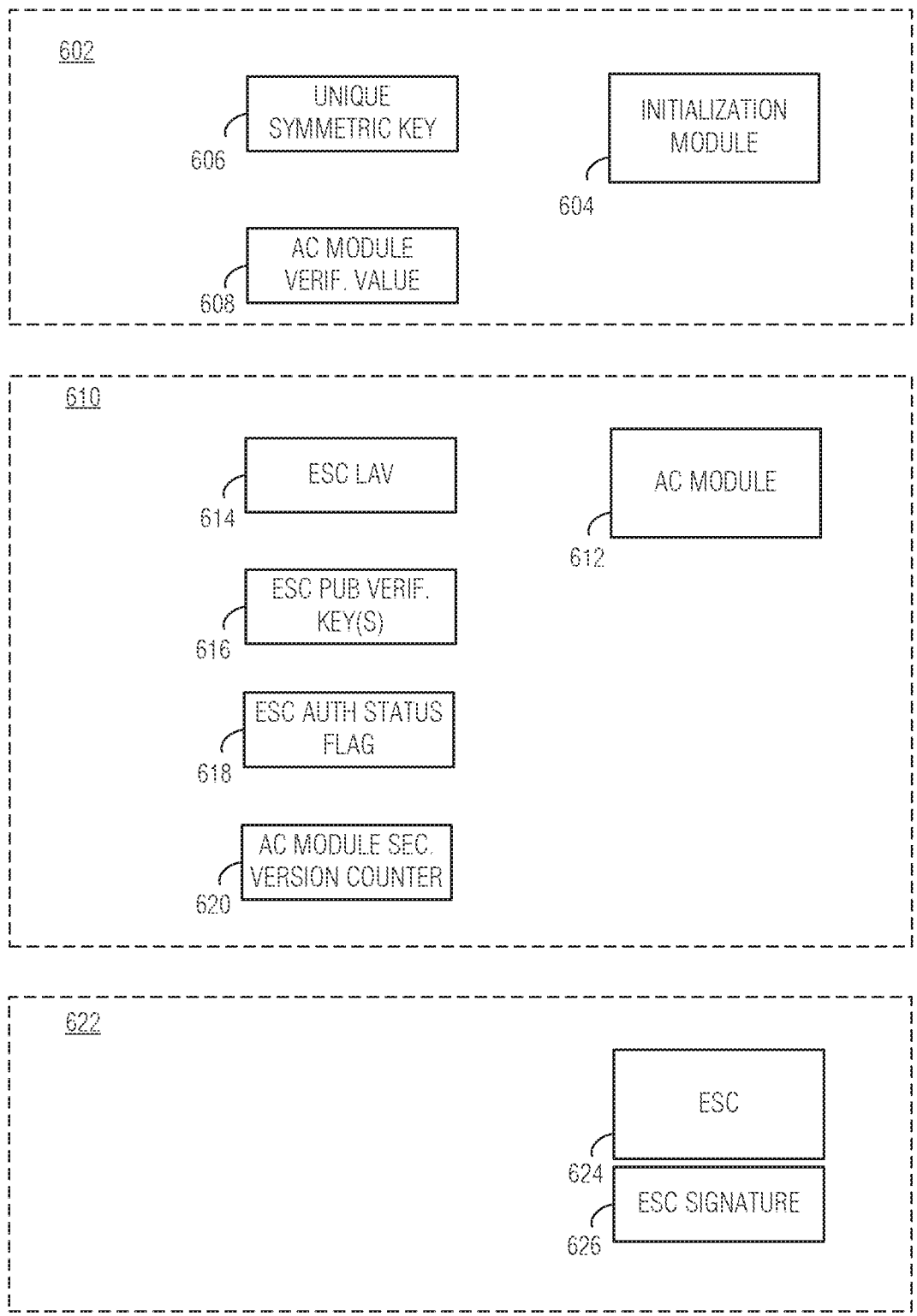
FIG. 6 is a block diagram illustrating various portions of code and data items to implement an isolated execution environment-based authenticity verification system utilizing processor hardware according to some embodiments.

FIG. 6 is a block diagram illustrating various portions of code and data items to implement an isolated execution environment-based authenticity verification system utilizing processor hardware according to some embodiments. Secure non-volatile memory 602, contains initialization module 604, which includes the initial instructions executed by the processor upon startup. Initialization module 604 is firmware that calls other components in the boot process, and in some embodiments performs certain authentication verification operations, such as checking the source-authentication state flag and performing the processor verification of the ESC using the LAV. Also, the initialization module 604 may verify the AC module integrity prior to calling the AC module. Unique symmetric key 606 is stored in an access-controlled permanent location, such as nonvolatile memory, fuses, or PUFs in the CPU according to some embodiments. An AC module verification value 608, such as a cryptographic hash of the AC module, may also be stored in secure non-volatile memory.

Non-volatile memory 610 contains AC module 612, as well as the LAV of the ESC 614, the public key 616 belonging to the source of the ESC, whose private key was used for digitally signing the ESC, the ESC authentication status flag 618, and secure version counter 620 for the ESC.

Data store 622, which may be RAM or a disk drive, for example, stores newly-received ESC 624 and the digital signature 626 accompanying the ESC.

Figure 7:
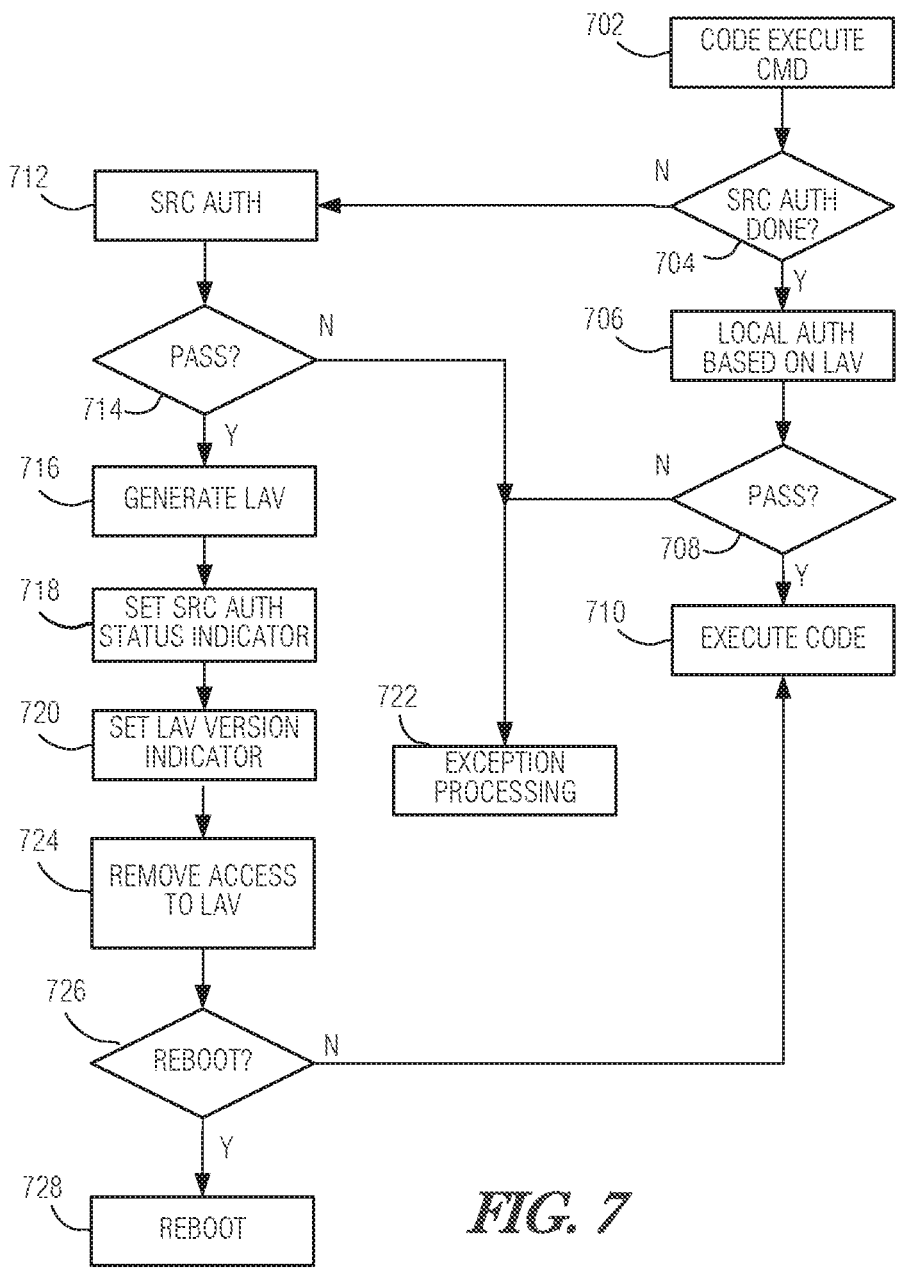
FIG. 7 is a process flow diagram illustrating an example process for code authentication according to some embodiments.

FIG. 7 is a process flow diagram illustrating an example process for code authentication according to some embodiments. It is important to note that the process is a richly-featured embodiment that may be realized as described; in addition, portions of the process may be implemented while others are excluded in various embodiments. The following Additional Notes and Examples section details various combinations, without limitation, that are contemplated. It should also be noted that in various embodiments, certain process operations may be performed in a different ordering than depicted in FIG. 7, provided that the logical flow and integrity of the process is not disrupted in substance.

At 702 the processor detects a command to execute the ESC. Decision 704 determines whether the source-authentication has been successfully completed for the ESC. This operation may be performed by checking the source-authentication status flag 618, for example. In the affirmative case, the process advances to performing local, e.g., processor-based, authentication of the ESC based on the existing LAV 614 of the ESC (operation 706).

In one embodiment, the local authentication 706 involves computing a cryptographic hash of the ESC, and then encoding the hash with the unique symmetric key 606, and comparing the result against the stored LAV 614. If the result of the comparison is a match, the local authentication is considered to have passed at decision 708, and the process proceeds to permit execution of the ESC at 710. If the result of decision 708 is a failure of authentication, the process branches to exception processing at block 722, which may involve such operations as rolling back the ESC to its previous version, for example, and initiating a notification to a user and logging the failure. In one embodiment, operations 704-708 may be performed by the processor executing the initialization module 604. In another embodiment, these operations to verify code prior to executing may be repeated on other pieces of code, such as UEFI, an operating system component, or other firmware or software program.

Returning to decision 704, if the source-authentication has not been completed, the process advances to block 712, where the source-authentication is performed. The branching to block 712 may involve execution of AC module 612, which performs operations 712-720. Decision 714 represents the result of the source-authentication. In the affirmative case, the process advances to block 716, where the LAV for the ESC is generated. At 718, the source authentication status indicator 618 is toggled to indicate that the source-authentication is complete and that an LAV is available for verification. At 720, the LAV version indicator is set, which may be implemented by a security version counter 620. At 724, the CPU removes access to the LAV from the IEE, as it is no longer needed. At 726, the CPU determines whether it wants to continue the boot process by executing the code that was just verified by the AV, or whether it should reboot and follow the path using the LAV to authenticate the ESC. This decision may be hard coded in the CPU. If the decision is not to reboot, the ESC may be executed at 710. In response to failure of the source-authentication at decision block 714, the process branches to exception processing 722.

Figure 8:
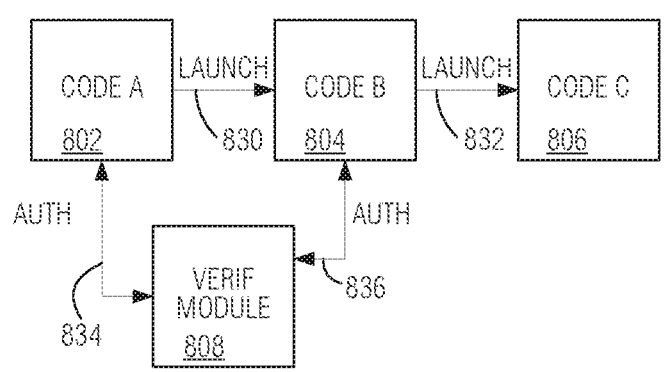
FIG. 8 is a flow diagram illustrating step-wise authentication of code utilizing aspects according to some embodiments.

FIG. 8 is a flow diagram illustrating step-wise authentication of code utilizing aspects according to some embodiments. This process flow illustrates the principle that one piece of code may call upon an authentication process to verify the authenticity of another piece of code to be called for execution. As illustrated, code A, which may be initialization module, or some other piece of code, includes instructions to launch code B, as indicated at 830, which may be a program to be called as part of the boot process of the processor or computer system. Prior to launching code B, code A performs authentication of code B. Verification module 808 may be called upon at 834 to perform some or all of the a process such as the one described above with reference to FIG. 7 on code B as the "ESC." Upon return of an indication of successful authentication of code B 804, the launching of code B at 830 is permitted. In a related embodiment, process blocks 702-710 are performed by code A.

In turn, as illustrated, code B includes instructions to launch code C 806. In similar fashion, code B performs authentication of code C, utilizing verification module 808 as needed via call 836. Upon successful authentication of code C 808, code C may be launched at 832. In a related embodiment, process blocks 702-710 are performed by code B.

Examples, as described herein, may include, or may operate on, logic or a number of components, engines, or modules, which for the sake of consistency are termed modules, although it will be understood that these terms may be used interchangeably. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which modules are temporarily configured, each of the modules need not be instantiated at any one moment in time. For example, where the modules comprise a general-purpose hardware processor core configured using software; the general-purpose hardware processor core may be configured as respective different modules at different times. Software may accordingly configure a hardware processor core, for example, to constitute a particular module at one instance of time and to constitute a different module at a different instance of time.

Additional Notes & Examples

Example 1 is a computing device, comprising: execution hardware including at least one processor core, a verification module, and non-volatile memory storing a private symmetric key (PSK) unique to the computing device; wherein when executed, the verification module causes the execution hardware to: perform pre-execution local authenticity verification of externally-supplied code (ESC) in response to a command to launch the ESC; wherein the local authenticity verification includes computation of a cryptographic message authentication code (MAC) of the ESC based on the PSK, and verification of the MAC against a stored local authenticity verification value (LAV) previously written to the non-volatile memory; and in response to a positive verification of the of the MAC, permit execution of the ESC.

In Example 2, the subject matter of Example 1 optionally includes, wherein the non-volatile memory includes a secure register that stores input used in determining the PSK, wherein access to the PSK is limited to only the verification module, and to authorized code executing in an isolated execution environment (IEE).

In Example 3, the subject matter of Example 2 optionally includes, wherein the secure register includes programmable fuses.

In Example 4, the subject matter of any one or more of Examples 2-3 optionally include, wherein the secure register includes at least one physical unclonable function (PUF).

In Example 5, the subject matter of any one or more of Examples 2-4 optionally include, wherein the execution hardware and the secure register are formed on a common semiconductor substrate.

In Example 6, the subject matter of any one or more of Examples 2-5 optionally include, wherein the non-volatile memory is formed on a common semiconductor substrate on which the execution hardware is formed.

In Example 7, the subject matter of any one or more of Examples 1-6 optionally include, wherein the LAV was produced only as result of a positive source-authentication of the ESC.

In Example 8, the subject matter of Example 7 optionally includes, wherein computation of the LAV includes application of a cryptographic function to the ESC based on the PSK.

In Example 9, the subject matter of any one or more of Examples 7-8 optionally include, wherein computation of the LAV includes application of a cryptographic function to the ESC based on the PSK by the execution hardware.

In Example 10, the subject matter of any one or more of Examples 7-9 optionally include, wherein the source-authentication includes verification of a digital signature of the ESC by the computing device.

In Example 11, the subject matter of any one or more of Examples 7-10 optionally include, wherein in response to a positive source-authentication of the ESC, the execution hardware is to set an authentication status value for the ESC representing completion of the source-authentication, wherein the authentication status value is used to determine when source-authentication is needed.

In Example 12, the subject matter of any one or more of Examples 7-11 optionally include, wherein the source-authentication is more computationally intensive than the local authenticity verification.

In Example 13, the subject matter of any one or more of Examples 1-12 optionally include, wherein the verification module includes an initialization module and an authentication converter module, and wherein: the authentication converter causes the execution hardware to perform verification of a digital signature of the ESC and generation of the LAV in response to a positive result of the verification of the digital signature; and wherein the initialization module causes the execution hardware to preferentially perform the pre-execution local authenticity verification of the ESC when the LAV is available.

In Example 14, the subject matter of any one or more of Examples 1-13 optionally include, wherein the verification module is executed in a cache-as-RAM (CRAM) mode of the at least one processor core.

In Example 15, the subject matter of any one or more of Examples 1-14 optionally include, wherein the computing device includes an authentication converter module, and wherein the authentication converter module causes the execution hardware to perform verification of a digital signature of the ESC and generation of the LAV in response to a positive result of the verification of the digital signature.

In Example 16, the subject matter of Example 15 optionally includes, wherein the authentication converter module is executed in an isolated execution environment on the computing device.

In Example 17, the subject matter of any one or more of Examples 1-16 optionally include, wherein non-volatile memory contains a hash value of the authentication converter module.

In Example 18, the subject matter of any one or more of Examples 1-17 optionally include, wherein the verification module causes the execution hardware to store version information associated with LAV of the ESC.

In Example 19, the subject matter of any one or more of Examples 1-18 optionally include, wherein the PSK was produced by operation of a physical unclonable function (PUF) during manufacture of the execution hardware.

In Example 20, the subject matter of any one or more of Examples 1-19 optionally include, wherein the ESC includes boot code.

In Example 21, the subject matter of any one or more of Examples 1-20 optionally include, wherein the ESC includes system firmware.

In Example 22, the subject matter of any one or more of Examples 1-21 optionally include, wherein the ESC includes microcode.

In Example 23, the subject matter of any one or more of Examples 1-22 optionally include, wherein the ESC includes operating system code.

Example 24 is a method for authenticating code to be executed on a computing device, the method comprising: storing, in non-volatile storage of the computing device, a private symmetric key (PSK) unique to the computing device; performing, by the computing device, pre-execution local authenticity verification of externally-supplied code (ESC) in response to a command to launch the ESC, the local authenticity verification including: computing a cryptographic message authentication code (MAC) of the ESC based on the PSK; and verifying the MAC against a stored local authenticity verification value (LAV) previously written to the non-volatile storage; and in response to a positive verification of the of the MAC, permitting execution of the ESC In Example 25, the subject matter of Example 24 optionally includes, wherein the non-volatile storage includes a secure register that stores input used in determining the PSK, wherein access to the PSK is limited to only initialization and authentication converter processes, and to authorized code executing in an isolated execution environment (IEE) of the computing device.

In Example 26, the subject matter of Example 25 optionally includes, further comprising providing, in the secure register, programmable fuses.

In Example 27, the subject matter of any one or more of Examples 25-26 optionally include, further comprising providing, in the secure register, at least one physical unclonable function (PUF).

In Example 28, the subject matter of any one or more of Examples 24-27 optionally include, wherein the LAV was produced only as result of a positive source-authentication of the ESC.

In Example 29, the subject matter of Example 28 optionally includes, wherein computation of the LAV includes application of a cryptographic function to the ESC based on the PSK.

In Example 30, the subject matter of any one or more of Examples 28-29 optionally include, wherein computation of the LAV includes application of a cryptographic function to the ESC based on the PSK by the computing device.

In Example 31, the subject matter of any one or more of Examples 28-30 optionally include, wherein the source-authentication includes verification of a digital signature of the ESC by the computing device.

In Example 32, the subject matter of any one or more of Examples 28-31 optionally include, wherein in response to a positive source-authentication of the ESC, the computing device is to set an authentication status value for the ESC representing completion of the source-authentication, wherein the authentication status value is used to determine when source-authentication is needed.

In Example 33, the subject matter of any one or more of Examples 28-32 optionally include, wherein the source-authentication is more computationally intensive than the local authenticity verification.

In Example 34, the subject matter of any one or more of Examples 24-33 optionally include, wherein the computing device includes an initialization process and an authentication converter process, and wherein: the authentication converter process causes the computing device to perform verification of a digital signature of the ESC and generation of the LAV in response to a positive result of the verification of the digital signature; and wherein the initialization process causes the computing device to preferentially perform the pre-execution local authenticity verification of the ESC when the LAV is available.

In Example 35, the subject matter of any one or more of Examples 24-34 optionally include, wherein the initialization and authentication converter processes are executed in a cache-as-RAM (CRAM) mode of at least one processor core of the computing device.

In Example 36, the subject matter of any one or more of Examples 24-35 optionally include, wherein the computing device includes an authentication converter process, and wherein the authentication converter process causes the computing device to perform verification of a digital signature of the ESC and generation of the LAV in response to a positive result of the verification of the digital signature.

In Example 37, the subject matter of Example 36 optionally includes, wherein the authentication converter process is executed in an isolated execution environment on the computing device.

In Example 38, the subject matter of any one or more of Examples 24-37 optionally include, wherein the non-volatile storage contains a hash value of the authentication converter process.

In Example 39, the subject matter of any one or more of Examples 24-38 optionally include, further comprising storing version information associated with LAV of the ESC in the non-volatile storage.

In Example 40, the subject matter of any one or more of Examples 24-39 optionally include, wherein the PSK was produced by operation of a physical unclonable function (PUF) during manufacture of the computing device.

In Example 41, the subject matter of any one or more of Examples 24-40 optionally include, wherein the ESC includes boot code.

In Example 42, the subject matter of any one or more of Examples 24-41 optionally include, wherein the ESC includes system firmware.

In Example 43, the subject matter of any one or more of Examples 24-42 optionally include, wherein the ESC includes microcode.

In Example 44, the subject matter of any one or more of Examples 24-43 optionally include, wherein the ESC includes operating system code.

Example 45 is a computing device for authenticating code to be executed on a computing device, the computing device comprising: means for storing a private symmetric key (PSK) unique to the computing device; means for performing, by the computing device, pre-execution local authenticity verification of externally-supplied code (ESC) in response to a command to launch the ESC, the local authenticity verification performed using: means for computing a cryptographic message authentication code (MAC) of the ESC based on the PSK; and means for verifying the MAC against a stored local authenticity verification value (LAV) previously written to the means for storing; and means for permitting execution of the ESC in response to a positive verification of the of the MAC In Example 46, the subject matter of Example 45 optionally includes, wherein the means for storing includes a secure register that stores input used in determining the PSK, wherein access to the PSK is limited to only initialization and authentication converter means, and to authorized code executing in an isolated execution environment (IEE) of the computing device.

In Example 47, the subject matter of Example 46 optionally includes, further comprising at least one physical unclonable function (PUF).

In Example 48, the subject matter of any one or more of Examples 45-47 optionally include, wherein the LAV was produced only as result of a positive source-authentication of the ESC.

In Example 49, the subject matter of Example 48 optionally includes, wherein computation of the LAV includes application of a cryptographic function to the ESC based on the PSK.

In Example 50, the subject matter of any one or more of Examples 48-49 optionally include, wherein computation of the LAV includes application of a cryptographic function to the ESC based on the PSK by the computing device.

In Example 51, the subject matter of any one or more of Examples 48-50 optionally include, wherein the source-authentication includes verification of a digital signature of the ESC by the computing device.

In Example 52, the subject matter of any one or more of Examples 48-51 optionally include, wherein in response to a positive source-authentication of the ESC, the computing device is to set an authentication status value for the ESC representing completion of the source-authentication, wherein the authentication status value is used to determine when source-authentication is needed.

In Example 53, the subject matter of any one or more of Examples 48-52 optionally include, wherein the source-authentication is more computationally intensive than the local authenticity verification.

In Example 54, the subject matter of any one or more of Examples 45-53 optionally include, wherein the computing device includes initialization means and an authentication converter means, and wherein: the authentication converter means causes the computing device to perform verification of a digital signature of the ESC and generation of the LAV in response to a positive result of the verification of the digital signature; and wherein the initialization means causes the computing device to preferentially perform the pre-execution local authenticity verification of the ESC when the LAV is available.

In Example 55, the subject matter of any one or more of Examples 45-54 optionally include, wherein the initialization and authentication converter means are implemented in a cache-as-RAM (CRAM) mode of at least one processor core of the computing device.

In Example 56, the subject matter of any one or more of Examples 45-55 optionally include, wherein the computing device includes an authentication converter means, and wherein the authentication converter means causes the computing device to perform verification of a digital signature of the ESC and generation of the LAV in response to a positive result of the verification of the digital signature.

In Example 57, the subject matter of Example 56 optionally includes, wherein the authentication converter means is implemented in an isolated execution environment on the computing device.

In Example 58, the subject matter of any one or more of Examples 45-57 optionally include, wherein the means for storing contains a hash value of the authentication converter means.

In Example 59, the subject matter of any one or more of Examples 45-58 optionally include, further comprising storing version information associated with LAV of the ESC in the means for storing.

In Example 60, the subject matter of any one or more of Examples 45-59 optionally include, wherein the PSK was produced by operation of a physical unclonable function (PUF) during manufacture of the computing device.

In Example 61, the subject matter of any one or more of Examples 45-60 optionally include, wherein the ESC includes boot code.

In Example 62, the subject matter of any one or more of Examples 45-61 optionally include, wherein the ESC includes system firmware.

In Example 63, the subject matter of any one or more of Examples 45-62 optionally include, wherein the ESC includes microcode.

In Example 64, the subject matter of any one or more of Examples 45-63 optionally include, wherein the ESC includes operating system code.

Example 65 is a machine-readable medium containing instructions executable on a computing device having execution hardware including at least one processor core, and non-volatile memory storing a private symmetric key (PSK) unique to the computing device, wherein the instructions, when executed, cause the execution hardware to: perform pre-execution local authenticity verification of externally-supplied code (ESC) in response to a command to launch the ESC; wherein the local authenticity verification includes computation of a cryptographic message authentication code (MAC) of the ESC based on the PSK, and verification of the MAC against a stored local authenticity verification value (LAV) previously written to the non-volatile memory; and in response to a positive verification of the of the MAC, permit execution of the ESC In Example 66, the subject matter of Example 65 optionally includes, wherein the LAV was produced only as result of a positive source-authentication of the ESC.

In Example 67, the subject matter of Example 66 optionally includes, wherein computation of the LAV includes application of a cryptographic function to the ESC based on the PSK.

In Example 68, the subject matter of any one or more of Examples 66-67 optionally include, wherein computation of the LAV includes application of a cryptographic function to the ESC based on the PSK by the execution hardware.

In Example 69, the subject matter of any one or more of Examples 66-68 optionally include, wherein the source-authentication includes verification of a digital signature of the ESC by the computing device.

In Example 70, the subject matter of any one or more of Examples 66-69 optionally include, wherein in response to a positive source-authentication of the ESC, the instructions are to cause the execution hardware to set an authentication status value for the ESC representing completion of the source-authentication, wherein the authentication status value is used to determine when source-authentication is needed.

In Example 71, the subject matter of any one or more of Examples 66-70 optionally include, wherein the source-authentication is more computationally intensive than the local authenticity verification.

In Example 72, the subject matter of any one or more of Examples 65-71 optionally include, wherein the instructions, when executed, implement an initialization module and an authentication converter module, and wherein: the authentication converter causes the execution hardware to perform verification of a digital signature of the ESC and generation of the LAV in response to a positive result of the verification of the digital signature; and wherein the initialization module causes the execution hardware to preferentially perform the pre-execution local authenticity verification of the ESC when the LAV is available.

In Example 73, the subject matter of any one or more of Examples 65-72 optionally include, wherein the instructions are to be executed in a cache-as-RAM (CRAM) mode of the at least one processor core.

In Example 74, the subject matter of any one or more of Examples 65-73 optionally include, wherein the instructions, when executed, implement an authentication converter module, and wherein the authentication converter module causes the execution hardware to perform verification of a digital signature of the ESC and generation of the LAV in response to a positive result of the verification of the digital signature.

In Example 75, the subject matter of Example 74 optionally includes, wherein the authentication converter module is executed in an isolated execution environment on the computing device.

In Example 76, the subject matter of any one or more of Examples 65-75 optionally include, wherein non-volatile memory contains a hash value of the authentication converter module.

In Example 77, the subject matter of any one or more of Examples 65-76 optionally include, wherein the instructions, when executed, cause the execution hardware to store version information associated with LAV of the ESC.

In Example 78, the subject matter of any one or more of Examples 65-77 optionally include, wherein the ESC includes boot code.

In Example 79, the subject matter of any one or more of Examples 65-78 optionally include, wherein the ESC includes system firmware.

In Example 80, the subject matter of any one or more of Examples 65-79 optionally include, wherein the ESC includes microcode.

In Example 81, the subject matter of any one or more of Examples 65-80 optionally include, wherein the ESC includes operating system code.

Example 82 is a computing device comprising means for carrying out operations according to the subject matter according to any one or more of Examples 24-44.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B." "B but not A." and "A and B." unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A computing system for local verification of code authentication, comprising:
   at least one hardware processor core, a secure boot code stored in an intialization module, and electrically erasable programmable read-only memory (EEPROM) storing a private root key unique to the computing system;
   wherein when executed, the secure boot code stored in the intialization module causes the execution hardware to:
   perform pre-execution integrity and authenticity verification of an externally-supplied firmware module in response to a command to load the firmware module, wherein the integrity and authenticity verification includes computation of a hash-based cryptographic structure of the firmware module based on the stored private root key, and verification of the hash-based cryptographic structure against a stored value previously written to the EEPROM, wherein access to the private root key is limited to only the computation of the authenticity verification, and to authorized code being excuted in an isolated execution environment (IEE) of the computing device; and
   in response to a positive verification of the of the hash-based cryptographic structure, permit execution of the firmware module.

2. The computing system of claim 1, wherein the firmware module includes a second secure boot code, which when executed, causes the execution hardware to perform pre-execution integrity and authenticity verification of a second firmware module.

3. At least one non-transitory machine-readable storage medium including instructions to implement secure boot code for local verification of code authentication, which when executed by a machine, cause the machine to perform the operations comprising:
   accessing a private root key unique to the machine, the private root key stored in erasable programmable read-only memory (EEPROM);
   performing pre-execution integrity and authenticity verification of an externally-supplied firmware module in response to a command to load the firmware module, wherein the integrity and authenticity verification includes computation of a hash-based cryptographic structure of the firmware module based on the private root key, and verification of the hash-based cryptographic structure against a stored value previously written to the EEPROM, wherein access to the private root key is limited to only the computation of the authenticity verification, and to authorized code being excuted in an isolated execution environment (IEE) of the machine; and
   in response to a positive verification of the of the hash-based cryptographic structure, permitting execution of the firmware module.

4. The at least one non-transitory machine-readable medium of claim 3, wherein the firmware module includes a second secure boot code, which when executed, causes the execution hardware to perform pre-execution integrity and authenticity verification of a second firmware module.

5. A method to implement secure boot code for local verification of code authentication on a computing device, comprising:
   accessing a private root key unique to the computing device, the private root key stored in erasable programmable read-only memory (EEPROM);
   performing pre-execution integrity and authenticity verification of an externally-supplied firmware module in response to a command to load the firmware module, wherein the integrity and authenticity verification includes computation of a hash-based cryptographic structure of the firmware module based on the private root key, and verification of the hash-based cryptographic structure against a stored value previously written to the EEPROM, wherein access to the private root key is limited to only the computation of the authenticity verification, and to authorized code being excuted in an isolated execution environment (IEE) of the computing device; and
   in response to a positive verification of the of the hash-based cryptographic structure, permitting execution of the firmware module.

* * * * *

UNITED STATES PATENT AND TRADEMARK OFFICE
CERTIFICATE OF CORRECTION

PATENT NO. : 10,826,904 B2  
APPLICATION NO. : 16/294538  
DATED : November 3, 2020  
INVENTOR(S) : Ernie F. Brickell Page 1 of 1

It is certified that error appears in the above-identified patent and that said Letters Patent is hereby corrected as shown below:

In the Claims

In Column 18, Line 1, in Claim 1, delete "excuted" and insert --executed-- therefor In Column 18, Line 30, in Claim 3, delete "excuted" and insert --executed-- therefor In Column 18, Line 57, in Claim 5, delete "excuted" and insert --executed-- therefor Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*